324-77 CROSS REFERENCE SEARCH ROOI
Magnetic Ink

KENNETH R. ELDREDGE
PHILIP E. MERRITT
MENDOLE D. MARSH
INVENTORS.
BY Lyon & Lyon
ATTORNEYS

AUTOMATIC READING SYSTEM

KENNETH R. ELDREDGE
PHILIP E. MERRITT
MENDOLE D. MARSH
INVENTORS.

BY Lyon & Lyon
ATTORNEYS

1

2,992,408

AUTOMATIC READING SYSTEM

Kenneth R. Eldredge, Palo Alto, Philip E. Merritt, Menlo Park, and Mendole D. Marsh, Palo Alto, Calif., assignors, by mesne assignments, to General Electric Company, New York, N.Y., a corporation of New York Filed May 16, 1955, Ser. No. 508,468
12 Claims. (Cl. 340—149)

Figure 1:
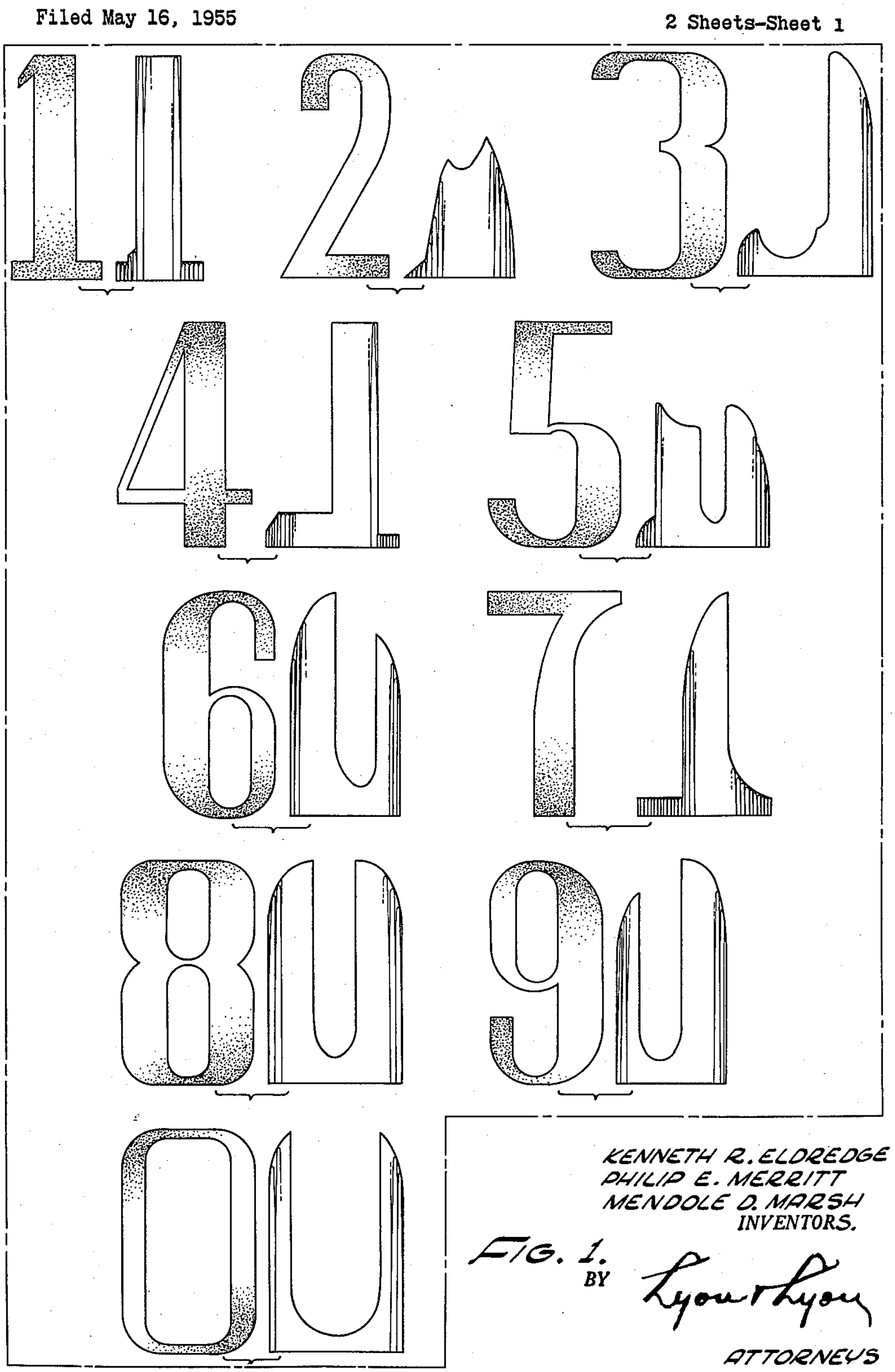

This invention relates to apparatus for reading characters in human language and obtaining therefrom signals representative thereof in machine language.

In an application for an Automatic Reading System by Kenneth R. Eldredge, Serial Number 506,598 filed May 6, 1955, which is assigned to a common assignee, there is described and claimed an apparatus and system for reading data written in human language automatically without human intervention and obtaining therefrom signals which are in a binary-coded form which can be used in information-handling machines. This apparatus briefly included an arrangement whereby the human-language data was printed in an ink which is capable of being magnetized. An arrangement is provided for magnetizing the ink. The data can then be read by passing each character successively under a reading head. The output of the reading head is then detected and the resultant wave shape is uniquely characteristic for each different character. It was shown that sampling points along the wave shape could be selected to provide signals which can be converted into a unique voltage pattern which is a binary representation for the character. By a code-converting matrix this representation may be converted readily into any of the presently favored binary coded decimal forms. The present invention is for another arrangement for reading without human intervention to provide a machine language representation of the data which is read.

An object of the present invention is to provide a new and improved arrangement for converting human language into machine language without the intervention of human readings and transcribers.

Another object of the present invention is the provision of simple and useful apparatus for converting human language into machine language.

These and other objects of the present invention are achieved by writing the characters which are to be converted into machine language with a writing material having magnetic properties. Such a writing material may be a magnetic ink such as the one described and claimed in an application by Charles B. Clark for Magnetic Ink, filed February 8, 1955, Serial Number 486,985. This application is assigned to a common assignee. When characters written with magnetic-writing material are magnetized and then passed in sequence under a magnetic-reading head, it can be shown that the output obtained from the reading head for each character is a signal having a wave shape which is individual to the character. Means are provided for using a magnetic-writing head which is excited by an alternating-current source so that the signal for each character has an envelope which is characteristic thereof but which is made up of a plurality of pulses corresponding to the oscillation frequency of the writing head. Means are provided for counting these pulses and for using counter output for dividing the signal read into a number of areas. Each area is separately integrated and all of these are compensated for variations in the amplitudes of the signals caused by variations in printing, speed, motion, etc. The compensated areas are represented by voltages whose amplitudes present a voltage pattern which may be considered characteristic of the letter or number which has been scanned. This voltage pattern is then converted to a voltage pattern which is a binary representation of the scanned character. The binary representation may then be directly employed or converted to any desired code for subsequent utilization.

2

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIGURE 1 is shown to assist in understanding this invention. Numerals 0 through 9 are printed with a magnetic reading material, magnetized, scanned by a magnetic reading head, and then demodulated to provide the associated distinctive wave shapes; and FIGURE 2 is a block diagram of an embodiment of the invention.

FIGURE 1 of the drawings shows the numbers 0 through 9 as printed in human language. Although numbers are shown, this is not to be considered as a limitation on the invention since the principles described here apply equally well to letters and other marks. The ink used to print the numbers is magnetic ink, which may consist of a vehicle having a suitable consistency to support a pigment which has magnetic characteristics. The magnetically written characters are magnetized by an alternating-current type of magnetization. They are then passed under a magnetic-reading head and its output is rectified. The resulting wave shapes, it may be seen, are extremely distinctive and may be considered as characteristic of the number from which they are produced. It will be seen that each signal actually consists of a plurality of pulses having twice the frequency of magnetization which have the over-all envelope which is characteristic of the number. The number of pulses in each wave shape is a function of the motion of the paper and the frequency of the oscillator and width of the character.

Figure 2:
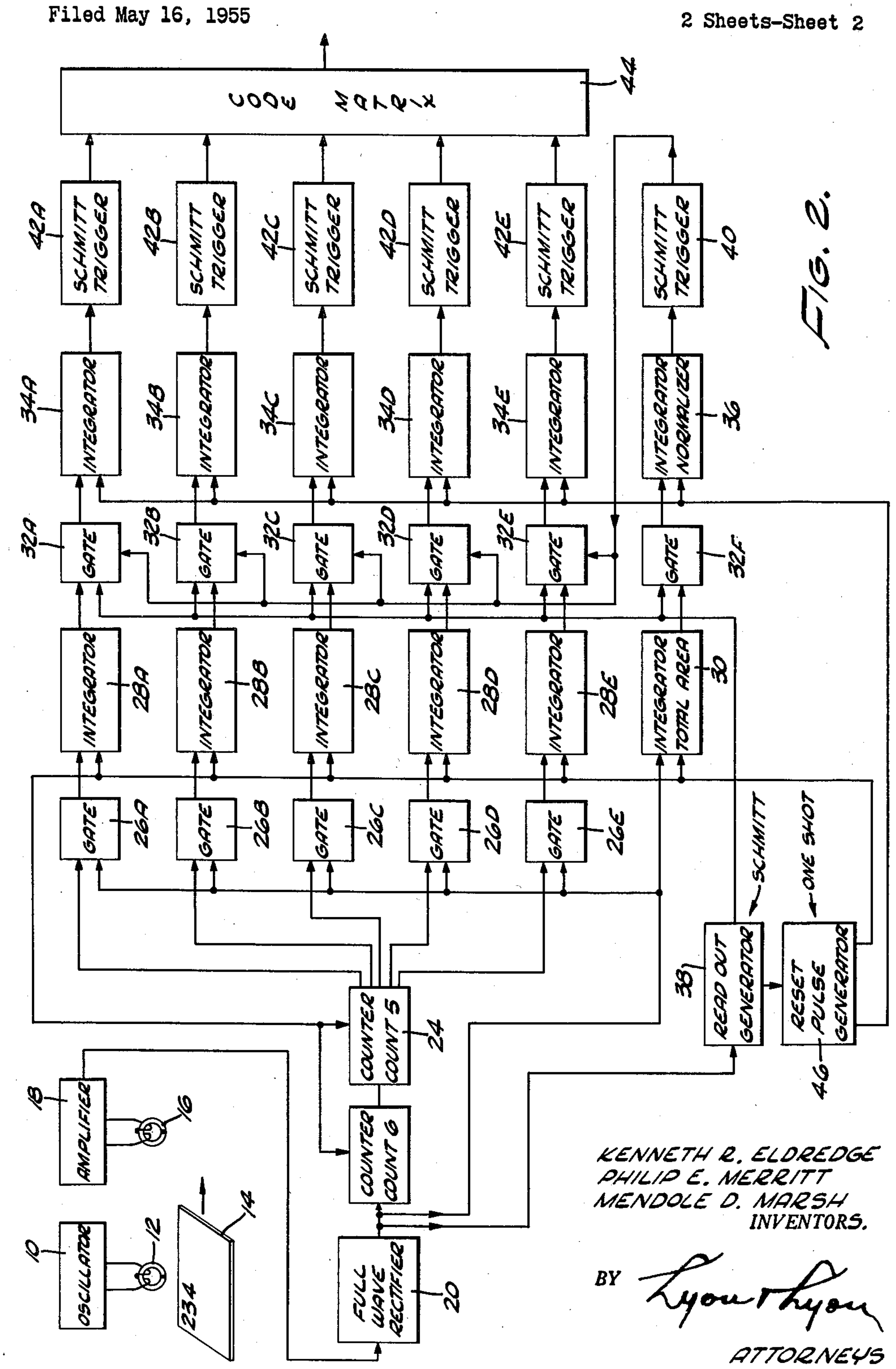

FIGURE 2 is a block schematic diagram of an embodiment of the invention. A writing station includes an oscillator 10 which has its output applied to a magnetic transducer 12, or writing head. The frequency of oscillation may be on the order of 10 kc., although this is not to be considered a limitation on the invention. A paper 14, on which the data to be read was written with magnetic ink, is passed under the writing head at a uniform speed by means of a conveyor (not shown). The characters on the paper are thus magnetized by the alternating magnetic field.

The paper is next carried underneath a magnetic-reading head 16. The magnetic characters induce a voltage in the reading-head coil having a peak amplitude which is proportional to the height of the mark covering the reading-head air gap and also to the intensity of the magnetization acquired at the write station. The resulting signal is an alternating signal having the frequency of the oscillator. This signal is amplified by the amplifier 18 and then applied to the full-wave rectifier 20. The output of the rectifier provides the characteristic wave shapes shown in FIGURE 1. It should be noted that a chaarcter passes under the reading head only once and the entire character is scanned during the single pass.

A complete signal from each of the characters, as a result of the frequency of magnetization, speed of motion, and character size, will include a number of pulses corresponding to a plurality of cycles of magnetization along the character. The complete signal is applied from the rectifier to a first counter 22, which counts the pulses and supplies a single output pulse for every given number of input pulses. The counter may be any of a number of suitable types, such as a binary counter, which counts to the given number and then is reset to zero. These are known as predetermined counters. A suitable counter is shown and described on page 611 of Waveforms, by Chance et al., published by the McGraw-Hill Book Company. For purposes of illustration, assume that the oscillator frequency, speed of motion, and character size are arranged to provide approximately thirty pulses per character. Thus the first counter is arranged to provide a single output pulse for every six input pulses. A second counter 24 is arranged to complete a cycle upon receiving five output pulses from the first counter. The second counter is a ring counter having five stages connected in a ring. These counters are also well known in the art. A suitable counter is shown and described on pages 612–614 of the above-noted Waveforms. Each stage of the ring counter provides an output as the count progresses.

Each stage of the ring counter is coupled to a different gate 26A—26E. As each stage is turned on in sequence by the advancing count, each gate is opened in sequence. Each gate closes as the count advances to the next stage. The output of the fullwave rectifier is also applied to all the gates. Therefore, each gate will pass a different portion of the signal received from the full-wave rectifier. Thus, an arrangement is provided for splitting the signal read into five different portions and sending each different portion into a different channel.

Each gate has its output coupled to a different integrator circuit 28A—28E. Each integrator circuit integrates that portion of the signal from the full-wave rectifier which passes through the gate. The amplitude of each integrated-signal portion is representative of the area of that signal portion. Thus, an arrangement is provided wherein a signal is split into five areas and each area is integrated. Gates and integrators of the type required are also well-known circuitry and are described, for example, on pages 364 et seq. and 663 et seq. of the above-indicated book Waveforms. The amplitudes of the five integrated areas will differ with each character which is scanned. This may be appreciated by considering the waveforms shown in FIGURE 1.

The amplitude of the signals detected by the reading head may vary due to different magnetizations, thicknesses of ink layer printed on paper, or consistency of ink amongst other things, although the wave shapes of the signals are substantially the same. In order to avoid erroneous results and to compensate for these signal-amplitude variations, a procedure which can be called "normalizing" is employed. If consistently uniform magnetization, ink, and printing can be obtained, then the additional normalizing structure described below may not be required. For the purposes of normalizing, there is provided a total-area integrator 30. This may have the identical structure as the integrators 28. It receives as its input the complete output of the rectifier 20. It integrates this to provide as output a voltage having an amplitude representative of the total area of the character which has passed under the reading head. This voltage varies with the variations caused by the factors previously mentioned. The output of each of the other integrators 28A—28E are applied to a different gate 32A—32E. The output of each gate is applied to a different integrator 34A—34E. The output of the total area integrator 30 is applied to a gate 32F, the output from which is applied to a normalizer integrator 36. These integrators may all have the same structure—that of the "Miller" integrator.

A readout-pulse generator 38 is provided. This is a circuit which provides a pulse at the termination of the signal from the rectifier. This circuit may be a Schmitt trigger circuit which is tripped upon receiving an input and returns to its initial condition when the input is removed. One output from the read out generator 38 opens the gates 32A—32F at the termnation of a signal at the rectifier which corresponds to a character passing out from under the reading head 16. Thus, the integrators 28A—28E and 30 all apply their outputs to the respective integrators 34A—34E and 36 through the gates 32A—32F as long as the gates are open.

The normalizer integrator output is applied to a trigger circuit 40, designated as a Schmitt trigger. This, as previously stated, is a well-known type of flip-flop circuit which is tripped from one stable condition to a second condition when its input voltage exceeds a predetermined amplitude value. As long as the input remains above a second amplitude value, which may have the same or a somewhat lower value determined by the circuit constants and operating voltages employed, the Schmitt trigger remains in its second stable state. When the input voltage drops below such value, the Schmitt trigger returns to its first stable state. The output of the Schmitt trigger when in its second stable state is applied to all the gates 32A—32F to inhibit or close these gates again. These inhibit gates are well known and also are described in the above-noted gate reference in the book Waveforms.

The characteristic of an integrating network is that it integrates an input voltage with respect to time. In order to obtain an output from the network having a desired amplitude value, such as that required to trip a Schmitt trigger circuit, either a small amplitude voltage may be applied to the network for a long interval, or a large amplitude voltage is applied to the network for a short time. In other words, for a given integrating network having fixed-time constants, the time required for obtaining a predetermined output value is a function of the amplitude of the input signal. Accordingly, the Schmitt trigger 40 is tripped sooner or later, depending upon the amplitude of the signal applied to the normalizer integrator. The larger the area integrator signal, the sooner the Schmitt trigger is tripped, and vice versa. This, in turn, determines the integrating time permitted for integrators 34A—34E to operate. Thus, the structure described operates to compensate for variations in the area of signals due to the various factors which cause variations in the signals detected from characters which pass under the reading head which are the same in human language. With a weaker signal, the time of integration by the integrators 34A—34E is extended; with a stronger signal, the time of integration is reduced. In this way, the voltage levels of the integrators 34A—34E are substantially standardized.

The output of each of these integrators is applied to a separate Schmitt trigger circuit 42A—42E. Each of these will be tripped to its second stable state or not, depending upon the amplitude of the voltage applied to its input. The voltage pattern presented by the integrators 34A—34E is a varying one about a voltage level which may be defined as the Schmitt trigger-circuit tripping level. The trigger circuits present the same voltage pattern except that only two voltage levels are provided as outputs in the voltage pattern. These voltage patterns are different for each different character which is passed under the reading head. They may thus be used to identify the character. They are a binary representation and thus are in a form to be used by a machine. However, if required, a code-converting matrix 44 may be employed. This can convert the output of the Schmitt triggers to any other desired code.

The output from the readout generator is applied to activate a reset-pulse generator 46. This reset-pulse generator is a unistable flip-flop which is driven to its unistable state by the readout generator output and then returns to its stable state after a time determined by the time constants of its circuit. This time is picked as that which will permit all circuits to be reset before the next character is detected. Thus, the reset pulse serves to reset all the integrators, as well as the counters, to ready the system for detecting the succeeding character. The time of occurrence of the actuation of the reset-pulse generator must be before the next character is detected to avoid an erroneous reading.

It should be noted that there may be variations in the number of pulses contained within a given character due to variations in speed or factors such as a character coming under the writing head in the middle of a cycle. These variations have substantially no effect on the accuracy of the arrangement, since all that is required is that the integrated area voltage be larger or smaller than a "zero" level. The apparatus does not function on absolute values. Furthermore, thin characters, such as 1 or I, may have less than 30 pulses, or whatever the requisite number is, and still be accurately detected by the present invention. All that happens in that case is that a number of the binary places will be zero. The voltage pattern of the remainder in combination with the zero places make these characters readily identifiable.

Accordingly, there has been shown and described above a novel arrangement wherein characters printed in human language may be translated into machine language automatically. Each character provides a distinguishable wave shape. Different portions of a signal are integrated to provide a voltage pattern output which is different for each wave shape. The voltage pattern, in turn, provides a coded representation of the character which can be employed by a machine.

We claim:

1. Apparatus for reading characters written in human language with magnetic ink comprising means to magnetize said characters, a magnetic reading head, means to move each character relative to said reading head, means to obtain from said reading head a signal for each character having an envelope characteristic of said character, means to which said character signal is applied to generate a plurality of voltages each having an amplitude representative of predetermined area portions of each signal envelope, means to generate a voltage having an amplitude representative of the total area of said signal, means to correct said plurality of voltages for variations in said area representative voltage, and means to convert said plurality of corrected voltages to a binary-number form representative of said character.

2. Apparatus for mechanically reading characters written in human language with magnetic ink comprising means to magnetize said characters, a magnetic reading head, means to move each character relative to said reading head, means to derive from said reading head a signal for each character having a wave shape characteristic of said character, and means to integrate several predetermined portions of a signal to provide a plurality of voltages having a pattern characteristic of said signal.

3. Apparatus for mechanically reading characters written in human language with magnetic ink comprising means to magnetize said characters, a magnetic reading head, means to move each character relative to said reading head, means to derive from said reading head a signal for each character having a wave shape characteristic of said character, means to integrate several predetermined portions of a signal to provide a plurality of voltages having different amplitudes, and means to convert said plurality of different amplitude voltages to a characteristic binary voltage pattern.

4. A system as recited in claim 3 wherein said means to magnetize said character includes means to apply an alternating-current magnetization to said character; and said means to integrate several predetermined portions of said signal includes an integrator for each of said portions, a normally closed gate for each integrator connected to the input thereof, means to apply said signal to all said gates, means to count the alternating-current pulses in said signal, and means to open each gate in sequence responsive to the counting of said means to count the alternating-current pulses.

5. A system for converting a character written in magnetic ink in human language to machine language comprising means to magnetize said character, a magnetic reading head, means to move said character under said magnetic reading head, means to obtain a signal from the output of said reading head having a wave shape characteristic of said character, means to separately integrate different portions of said signal, means to integrate said entire signal, means to separately integrate said integrated different portions for a time determined by the amplitude of said integrated entire signal, and means to establish a voltage pattern representative of said character responsive to said doubly integrated different portions having amplitudes above and below a predetermined level.

6. A system as recited in claim 5 wherein said means to separately integrate said integrated different portions for a time determined by the amplitude of said integrated entire signal includes a normalizing integrator, a plurality of integrators, means to simultaneously apply the output of said means to separately integrate different portions of said signal to said plurality of integrators and the output of said means to integrate said entire signal to said normalizing integrator, and means to interrupt the application of inputs to said plurality of integrators when said normalizing integrator output reaches a predetermined level.

7. A system as recited in claim 5 wherein said means to establish a voltage pattern representative of said character responsive to said doubly integrated different portions having amplitudes above and below a predetermined level includes a plurality of flip-flop circuits each being of the type which is tripped from a first to a second condition of stability by application thereto of a signal-exceeding said predetermined level.

8. Apparatus for recognizing each of a plurality of different wave shapes, comprising means for receiving any one of said different wave shapes and for resolving said wave shape into a plurality of temporal portions, a plurality of integrating means, and means for applying each of said portions to a respective one of said integrating means, each of said integrating means being responsive to the one of said temporal portions applied thereto for providing an output signal representing the integral of said one temporal portion, whereby the output signals of all of said integrating means provide a pattern characteristic of said wave shape.

9. Apparatus for recognizing each of a plurality of different wave shapes, comprising means for receiving any one of said different wave shapes and for resolving said wave shape into a plurality of temporal portions, a plurality of integrating means, means for applying each of said portions to a respective one of said integrating means, each of said integrating means being responsive to the one of said temporal portions applied thereto for providing an output signal representing the integral of said one temporal portion, and means responsive to all of said integrating means output signals for providing an output signal identifying said wave shape.

10. Apparatus for recognizing each of a plurality of different wave shapes, comprising means for receiving any one of said different wave shapes and for resolving said wave shape into a plurality of temporal portions, a plurality of integrating means, means for applying each of said portions to a respective one of said integrating means, each of said integrating means being responsive to the one of said temporal portions applied thereto for providing an output signal representing the integral of said one temporal portion, and means to convert each of the output signals of said integrating means to a signal representing a binary digit.

11. Apparatus for mechanically reading characters written in human language with magnetic ink, comprising means to magnetize said characters, a magnetic reading head, means to move each character relative to said reading head, means to derive from said reading head a signal for each character having a wave shape characteristic of said character, means for resolving said signal into a plurality of temporal portions, a plurality of integrating means, and means for applying each of said portions to a respective one of said integrating means, whereby the output signals of all of said integrating means provide a pattern identifying the character read.

12. In combination, means for receiving a wave shape and for resolving said wave shape into a plurality of temporal portions, a plurality of first integrating means, means for applying each of said portions to a respective one of said first integrating means, whereby each of said first integrating means provides an output signal corresponding to the integral of the entire temporal portion applied thereto, a plurality of second integrating means, means for applying each of said output signals of the first integrating means to a respective one of said second integrating means, an additional integrating means, means for applying said wave shape to said additional integrating means, whereby said additional integrating means provides an output signal corresponding to the integral of the entire wave shape applied thereto, means responsive to said output signal of the additional integrating means for providing a control signal having a duration inversely proportional to the amplitude of said output signal of the additional integrating means, and means responsive to said control signal and coupled to limit the integration of said output signals of the first integrating means by said second integrating means to a duration equal to said control signal duration.

References Cited in the file of this patent

UNITED STATES PATENTS

| | | |
|---|---|---|
| 2,616,983 | Zworykin et al. | Nov. 4, 1952 |
| 2,641,740 | Levy | June 9, 1953 |
| 2,751,433 | Linger | June 19, 1956 |
| 2,779,869 | Gerks | Jan. 29, 1957 |
| 2,784,392 | Chaimowicz | Mar. 5, 1957 |
| 2,807,005 | Weidenhammer | Sept. 17, 1957 |
| 2,819,456 | Stuart-Williams | Jan. 7, 1958 |
| 2,836,359 | Mazzagatti | May 27, 1958 |
| 2,843,676 | Halliday | July 15, 1958 |

OTHER REFERENCES

"The Analyzing Reader Character Sensing Technique," June 1954.

"The IMR Analyzing Reader," October 1954.

UNITED STATES PATENT OFFICE

CERTIFICATE OF CORRECTION

Patent No. 2,992,408 July 11, 1961

Kenneth R. Eldredge et al.

It is hereby certified that error appears in the above numbered patent requiring correction and that the said Letters Patent should read as corrected below.

Column 2, line 53, for "magnetic" read -- magnetized --.

Signed and sealed this 30th day of January 1962.

(SEAL)

Attest:

ERNEST W. SWIDER
Attesting Officer

DAVID L. LADD
Commissioner of Patents